United States Patent
Buettner et al.

[19]

[11] Patent Number: 6,163,691
[45] Date of Patent: Dec. 19, 2000

[54] CALLER IDENTIFICATION IN A RADIO COMMUNICATION SYSTEM

[75] Inventors: Nathan Andrew Buettner, Lewisville; George Christian Alford, Plano, both of Tex.

[73] Assignee: Uniden America Corporation, Fort Worth, Tex.

[21] Appl. No.: 09/103,698

[22] Filed: Jun. 24, 1998

[51] Int. Cl.[7] ................................................... H04Q 7/20
[52] U.S. Cl. ........................ 455/414; 455/415; 455/422; 455/445; 455/455; 455/566
[58] Field of Search .................................. 455/414, 415, 455/433, 517, 566, 425, 445, 455; 370/311, 447, 462, 341

[56] References Cited

U.S. PATENT DOCUMENTS

| | | | |
|---|---|---|---|
| 5,063,588 | 11/1991 | Patsiokas et al. | 455/31.2 |
| 5,115,223 | 5/1992 | Moody | 340/573 |
| 5,333,180 | 7/1994 | Brown et al. | 379/89 |
| 5,369,681 | 11/1994 | Boudreau et al. | 379/87 |
| 5,459,458 | 10/1995 | Richardson et al. | 340/825.52 |
| 5,548,631 | 8/1996 | Krebs et al. | 455/426 |
| 5,557,605 | 9/1996 | Grube et al. | 455/415 |
| 5,559,860 | 9/1996 | Mizikovsky | 455/415 |
| 5,722,067 | 2/1998 | Fougnies et al. | 455/415 |
| 5,764,730 | 6/1998 | Rbe et al. | 455/33.1 |
| 5,809,428 | 9/1998 | Garahin et al. | 455/517 |
| 5,845,211 | 12/1998 | Roach, Jr. | 455/436 |
| 5,857,816 | 1/1999 | Jedlicka | 379/142 |
| 5,873,031 | 2/1999 | Griffith et al. | 455/412 |
| 5,883,943 | 3/1999 | Siddiqui | 379/142 |
| 5,924,044 | 7/1999 | Vannatta et al. | 455/556 |
| 6,005,928 | 12/1999 | Johnson | 397/142 |
| 6,018,668 | 1/2000 | Schmidt | 455/518 |

*Primary Examiner*—Daniel S. Hunter
*Assistant Examiner*—Yemane Woldetatios
*Attorney, Agent, or Firm*—Fulbright & Jaworski L.L.P.

[57] ABSTRACT

A radio communication system is disclosed, wherein caller identification information is sent to called radios prior to the initiation of voice communications. The called radio's current checked-in cell sends call set up messages to the called radio and receives a response from the called radio. The cell then sends page information comprising the calling, or source, radio's identification. Voice communications are established immediately following the page data transmission. The called user is notified of the page information and can access the page message to determine which radio initiated the incoming call.

19 Claims, 2 Drawing Sheets

CALLER IDENTIFICATION IN A RADIO COMMUNICATION SYSTEM

RELATED APPLICATIONS

The present invention is related to pending application Ser. No. 09/103,402, entitled AUTOMATIC CALL TO PAGE CONVERSION IN A RADIO COMMUNICATION SYSTEM, filed concurrently herewith, the disclosure of which is hereby incorporated by reference herein.

TECHNICAL FIELD OF THE INVENTION

The present invention is related to radio communication systems and, more particularly, to providing caller identification in a mobile radio communications system having one or more cells.

BACKGROUND OF THE INVENTION

Radio communications systems, such as the multi-site trunked land mobile radio system which is described herein as an illustrative example, typically comprise one or more base stations which function as repeaters between mobile radio units. The radio units can communicate in either a direct call mode or a group call mode. In a direct call, one radio communicates directly with another radio through the repeater base station. In a group call, one radio can communicate with a plurality of radios in a designated group. The radio units transmit on one frequency and receive on a different frequency. The base stations act as a repeater between a sending radio and a receiving radio by receiving signals on the sending radio's transmit frequency and re-transmitting the signals on the receiving radio's receive frequency. Such a system is disclosed in U.S. Pat. No. 5,613,201, entitled AUTOMATIC CALL DESTINATION/SYSTEM SELECTION IN A RADIO COMMUNICATION SYSTEM, the disclosure of which is hereby incorporated by reference herein.

The base stations serve a specific geographic area, or cell, and each radio unit is assigned to a specific home cell. The cells may be linked together to cover a large area by linking the base stations so that they can exchange data and transmission signals. This multiple cell arrangement allows two or more radios to communicate even if they are not in communication with the same cell or repeater. The cells monitor assigned radios by tracking which cell is in communication with each radio. Also, each cell maintains a list of all the radios that are communicating with the base station, regardless of whether the radios are assigned to the cell or not.

When a radio unit initiates a call, the calling radio's current base station, or originating cell, performs call set up functions by determining if the called radio is checked into that cell. If the called radio is checked into the cell, then the cell exchanges call set up messages with the called radio. If the called radio is not within the originating cell, then the system determines where the called radio is located and the call information is routed to the called radio's current cell, or the destination cell. The destination cell then exchanges call set up messages with the called radio to complete the call. In the prior art mobile radio communication systems, there is no capability for providing calling radio identification to the called radio. As a result, the called radio users have no way of knowing who initiated the incoming call. The only way to identify the caller in the prior art systems is to actually answer the call. Accordingly, there is a need in the art for a caller identification function which will allow users to determine which radio has initiated a particular incoming call.

SUMMARY OF THE INVENTION

The illustrative system described herein addresses the problems of the prior art by using the page function of a radio communication system to provide caller identification information to the called radio. When a caller initiates a direct call, the cell serving the called radio sends page information to the called radio before initiating voice communications. The page message identifies the source, or calling, radio. After the page information is sent to the called radio, call setup information is sent and the called radio will respond to the incoming call, for example, by ringing. The called party is also alerted to the page information associated with the incoming call by an alert tone, a blinking light, a displayed icon or some other indication on the radio. The page message may be displayed automatically or the called party may select the page information from a menu display.

It is a feature of the present invention to provide a radio communication system in which caller identification information is sent to a called radio. The caller identification data is sent immediately prior to the call set up commands for the voice call. The called user is notified of both the incoming voice call and the corresponding caller identification information.

It is another feature of the present invention to use the page function of a radio communication system to provide caller identification information to a called radio. The source identification code for a calling radio is provided to the called radio's current cell, which uses the source identifier to format a page message to be sent to the called radio.

It is a further feature of the present invention to provide caller identification information for any caller. A source identifier can be used to identify another radio on the communications system. Alternatively, if the system is connected to a public switched telephone network, then the automatic number identification information on the telephone lines may be sent in the caller identification page message. Furthermore, in the case of a group call, the caller identification information may represent the calling party, the called group or both.

The foregoing has outlined rather broadly the features and technical advantages of the present invention in order that the example system illustrated in the detailed description of the invention may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
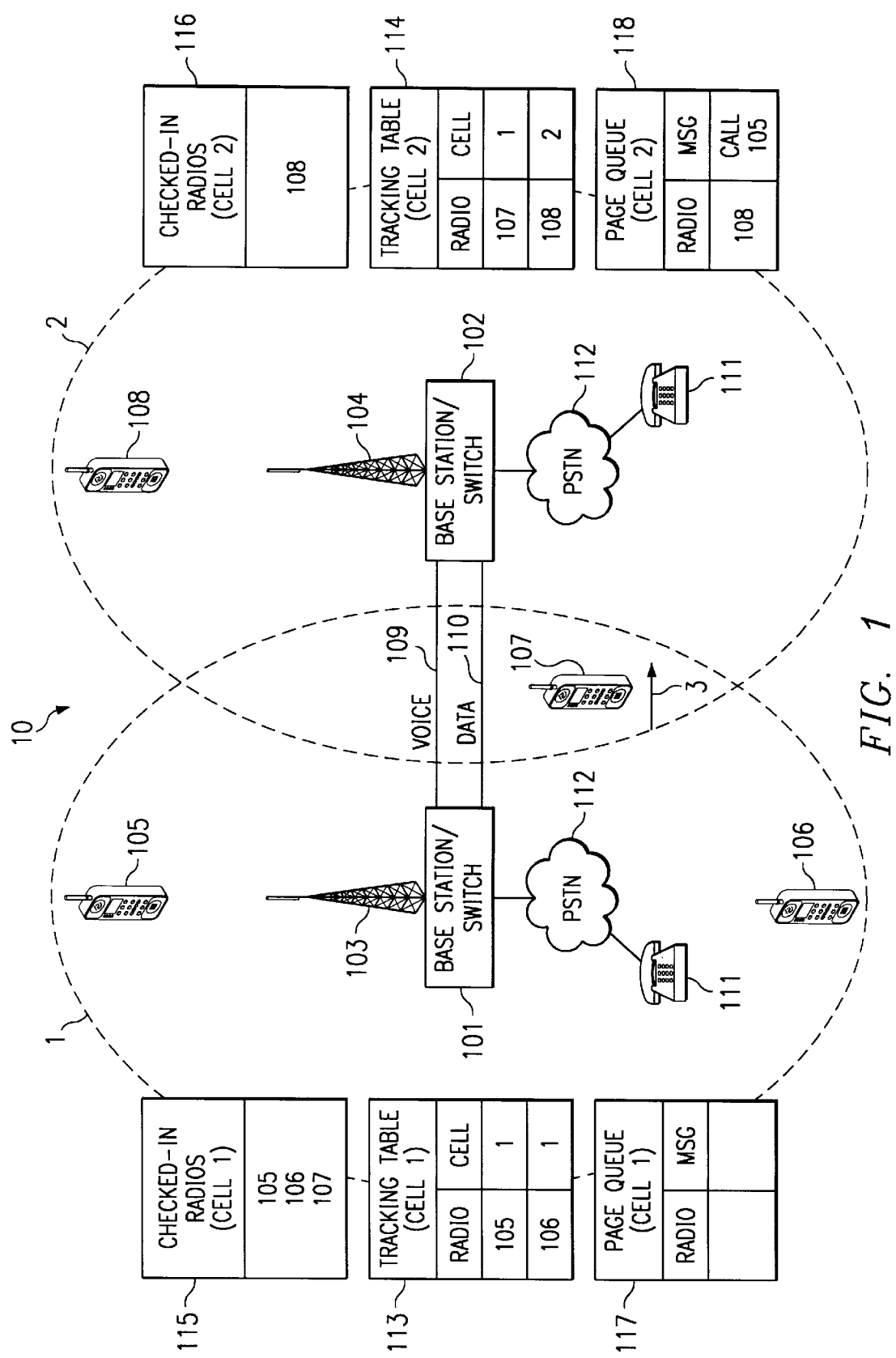
FIG. 1 is a block diagram of a radio communications system incorporating the present invention.

FIG. 1 illustrates a trunked mobile radio system 10 having base stations 101 and 102, which are coupled to antennas 103 and 104 respectively. Base stations, or switches, 101 and 102 are in radio frequency (RF) communication with radios 105–108, which may be hand-held, mobile or any other type of radios. Usually, base stations 101 and 102 function as repeaters, wherein signals are received from radios 105–108 on one frequency and then re-transmitted on a different frequency. Typically, the receive and transmit frequencies are paired as a distinct channel. Base stations 101 and 102 are capable of communicating via a number of such channels. Base stations 101, 102 and radios 105–108 may operate in any frequency band, such as in an 800 MHZ trunked mobile radio frequency band or in the UHF or VHF bands. Frequency selection is limited solely by the frequency bands assigned for use by the Federal Communications Commission (FCC).

Base stations 101 and 102 each serve a particular geographic area or cell, for example cell 1 is served by base station 101 and cell 2 is served by base station 102. The size of the cells is dependent upon the signal power produced by base stations 101, 102, height of antennas 103, 104 and environmental factors, such as the presence of natural or man-made signal obstructions. Depending upon the size of the area to be covered, a single base station cell may cover a sufficient region or, as illustrated in FIG. 1, a number of base stations can be linked together to cover a broader area. Base stations 101 and 102 are connected via voice link 109 and data link 110. Links 109 and 110 may be embodied as any connection that allows voice or data communications. The connection between base stations 101 and 102 over links 109 and 110 may be continuous, such as via a dedicated telephone trunk, or it may be a dial-up connection, such as a modem, which provides communication between base stations 101 and 102 only when required.

In system 10, radios may communicate in either a one-to-one or a one-to-many mode. For example, using base station 101 as a repeater, radio 105 can make a direct call to a single radio, such as radio 106, or radio 105 may communicate simultaneously with a group of radios. Communication links 109 and 110 allow base stations 101 and 102 to exchange signals and information for both direct and group calls. This enable two or more radios to communicate even though they are served by different base stations in different cells. For example, radio 105 can communicate with radio 108 even though radio 105 is in communication with base station 101 in cell 1 and radio 108 is in communication with base station 102 in cell 2. Base stations 101 and 102 exchange the signals from radios 105 and 108 over links 109 and 110. Link 110 is used to exchange tracking information and page data, which will be discussed in more detail below. Once a call has been established between two radios in different cells, such as between radios 105 and 108, then the voice transmission signals are exchanged over voice link 109.

In addition to providing a communication link between two or more radios, base stations 101 and 102 provide communication between radios 105–108 and telephone 111. Base stations 101 and 102 are coupled to public switched telephone network (PSTN) 112. Radios 105–108 have a numeric keypad which allows users to enter telephone number information. When base station 101 or 102 detects that a radio has initiated a call to PSTN 112, the base station uses the telephone number information and connects to the appropriate telephone 111. Alternatively, switches 101 and 102 may route incoming calls from telephone 111 to radios 105–108.

Radios 105–108 are each assigned to a particular home base station or cell. Each cell maintains a tracking table, such as table 113 for base station 101 and table 114 for base station 102. Tracking tables 113 and 114 indicate where each assigned radio is checked in. The checked in cell is the cell that is currently in RF communication with the radio. Table 113 shows that radios 105 and 106 are assigned to cell 1 and both are currently checked in to cell 1. On the other hand, table 114 shows that radios 107 and 108 are assigned to cell 2, but only radio 108 is checked into cell 2. Radio 107 is checked-in with cell 1.

Tables 113 and 114 are updated every time a radio checks into a new cell. Radios switch from one cell to another as they change locations. When radios 105–108 move out of a cell and can no longer communicate with a cell, the radios begin a search function to determine if the radio is within another cell. If another cell is detected, then the radio checks in with that new cell. For example, if radio 107 is moving East, as shown by arrow 3, eventually it will move out of the range of base station 101 and out of cell 1. When radio 107 moves out of cell 1 it will begin a search to determine if it is within the coverage of any other cell. In FIG. 1, as radio 107 moves out of cell 1, it moves into cell 2. Therefore, when RF communication with base station 101 is lost, radio 107 will ideally search out, detect and check in with base station 102 in cell 2.

When radio 107 checks in with cell 2, base station 102 updates tracking table 114 to indicate that the current cell for radio 107 is cell 2. In this example, radio 107 is assigned cell 2 as the home cell, therefore cell 2 maintains the tracking table for radio 107. If, on the other hand, radio 107 was assigned to cell 1 as the home cell, then base station 102 would inform base station 101, via link 110, that radio 107 had checked in to cell 2. Each cell also maintains a list, 115 and 116, of radios that are currently checked into that cell.

Radios 105–108 are each assigned a unique identification code which identifies each radio and its home cell. In order to initiate a direct call between two radios, the caller enters the called radio's identifier. The unique radio identifier is used to initiate communications between the radios. For example, in a direct call between radio 105 and radio 108, the caller enters radio 108's identifier on the keypad of radio 105. This information is transmitted to base station 101, which uses table 115 to determine if radio 108 is currently checked in to cell 1. Since radio 108 is not checked-in to cell 1, base station 101 contacts the home cell for radio 108. Switch 101 can determine which cell is radio 108's home cell from radio 108's unique identifier. In this case cell 2 is the home for radio 108. Switch 101 contacts switch 102 via link 110 and queries where radio 108 is currently checked-in. After determining where radio 108 is checked in, base station 101 then sends the direct call request to that cell, in this case cell 2. Cell 2 then sends call setup messages to radio 108 to complete the direct call. If radio 108 is still in communication with cell 2, a direct call connection is established between radios 105 and 108 via cells 1 and 2 over links 109 and 110.

In the situation where radio 108 moves outside the RF coverage of cells 1 and 2, a direct call cannot be established since radio 108 is not in RF communication with either base station. In this situation, system 10 notifies the caller that the called party is unavailable. Typically, system 10 will play a voice message asking the caller whether he or she desires to leave a message or page for the called party. The caller can enter a page message for radio 108, such as the identifier for radio 105. Alternatively, system 10 may automatically set up a page for radio 108 as described in co-pending application Ser. No. 09/103,402, entitled AUTOMATIC CALL TO PAGE CONVERSION IN A RADIO COMMUNICATION SYSTEM. Each base station has a page queue, 117 and 118, which holds the page information for radios that are not checked-in to system 10. The pages are held by system 10 until the radio checks-in and then the page is delivered. The page may be delivered as a text message that is displayed on the radio or some other indication may be used to prompt the user to retrieve the page.

Typically, a page is only sent when a called radio is unavailable, such as when the radio is off or out-of-range. However, in the present example, page information is sent after the switch has determined that the called radio is available. In the system described herein, the page information is sent with the call set up commands to provide an identification for the calling radio. The radio identification may be the unique identifier for the calling radio or some other identification.

Figure 2:
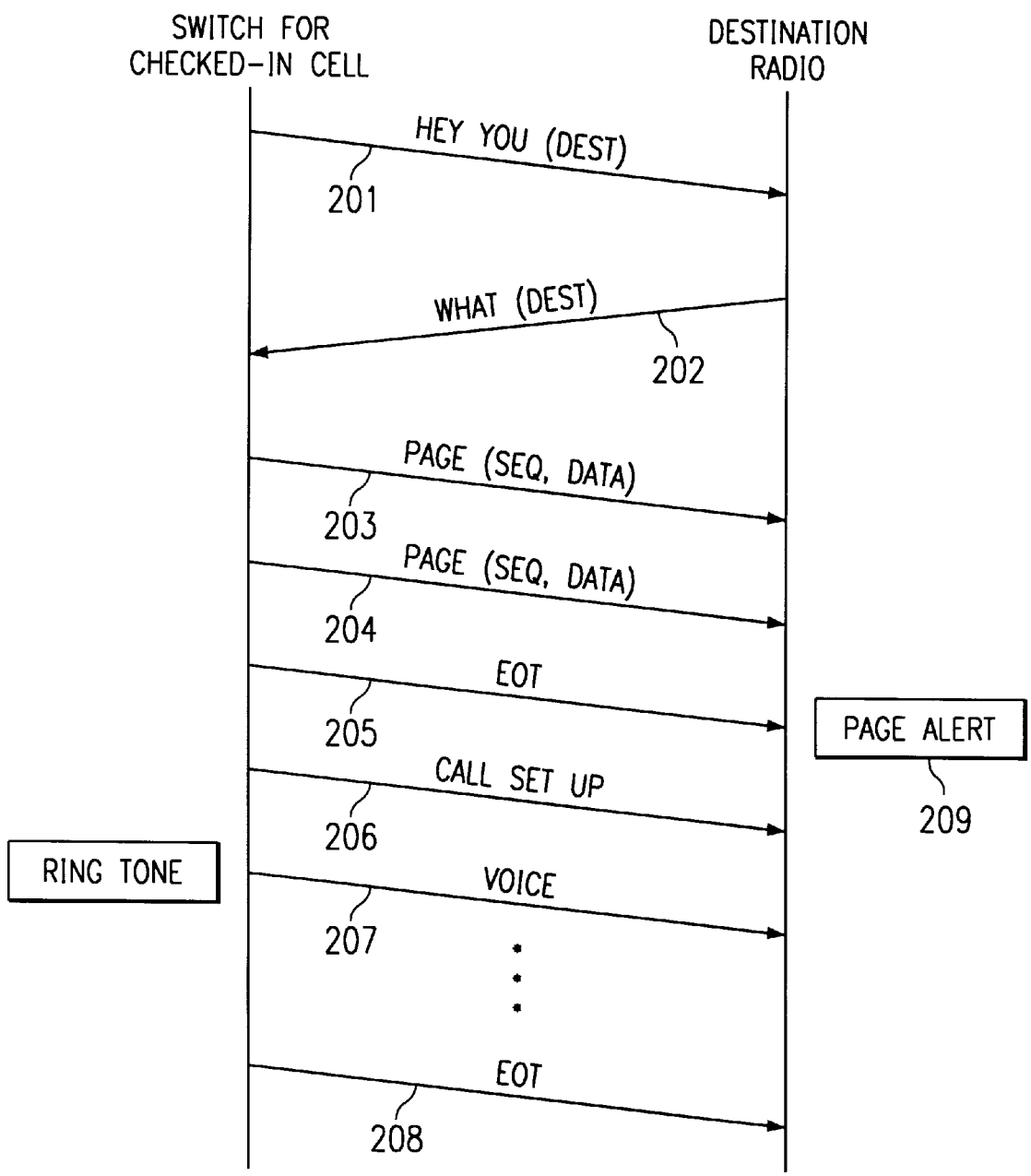
FIG. 2 is a bounce diagram illustrating signals exchanged between a switch and a radio in the present invention.

FIG. 2 is a bounce diagram of the signals that are exchanged between the switch and the called radio. The calling radio identification that is exchanged between the called radio and the switch will essentially be the same whether the radios are within the same cell or different cells.

For a radio to radio direct call on same cell, calling radio A initiates a call to called radio B. The switch for the cell detects the call from radio A and sends a "hey you" command 201 to radio B. When radio B responds with the "what" command 202, the switch issues a page 203 before sending the direct call from radio A. Page 203 contains the identification of calling radio A. The page may comprise multiple transmissions, such as pages 203–204, depending upon the amount of data that can be sent with each page transmission. Called radio B will combine these multiple partial page messages in the proper order to generate a single complete page message. An end of transmission (EOT) command 205 is sent when the complete page message has been sent. This page is not put into system paging queues 117 or 118 and the page is canceled if the subscriber does not respond.

Immediately after receiving the page, radio B receives a direct call as shown in steps 206–208. The manner in which the receiving radio handles these two events can be done in different ways. In one embodiment, the receiving radio may wait for a set amount of time after receiving the page to see if a direct call is coming. Then, once the direct call is received, the receiving radio can display the calling radio identification during the direct call. In another embodiment, the receiving radio may place the page in the radio's page queue and issue an alert 209 to the user. Then the user can look at the stored page for the identification of the calling radio for the current direct call.

When the called and calling radios are not on the same cell, the switch will recognize that called radio is not checked in because the called radio is not listed in the checked-in radio list 115, 116. If the switch is the home cell for the called radio, it will look up the current checked in cell for the called radio in radio location table 113, 114. Then, the switch will contact the correct cell via telephone lines 109, 110. The originating cell issues the direct call command and passes the destination radio identification and the calling radio identification to the destination cell. The destination cell proceeds as described above for FIG. 2. Following the exchange of the "hey you" and "what" commands in steps 201 and 202, the destination cell sends a page in steps 203–205 and then sends the direct call in steps 206–208.

On the other hand, if the called radio is not home to the originating cell, then the switch contacts the home cell for the called radio. The home cell is known since it is part of the called radio identifier. The originating cell issues the direct call command and passes the destination radio identification and the calling radio identification to the called radio's home cell. From this point, the called radio's home cell looks up the current checked in cell in the radio location table 113, 114 and routes the direct call command as described above.

Although the present invention and its advantages have been described in detail, it should be understood that various changes, substitutions and alterations can be made herein without departing from the spirit and scope of the invention as defined by the appended claims.

What is claimed is:

1. A radio communication system in which a plurality of radios communicate via one or more cells, wherein said radios are capable of receiving and displaying page messages having a text or numeric format and wherein said radios are also capable of voice communication with callers via said cells, said system comprising:

means for creating a page message that identifies a source of an incoming voice call to a called radio;

means for sending said page message to said called radio; and means for setting up voice communications between said called radio and said caller immediately after said page message is sent to said called radio.

2. The system of claim 1 further comprising:

means for determining a current checked-in cell for said called radio; and means for sending a source identifier for a calling radio to said current checked-in cell.

3. The system of claim 2 wherein said page message identifies said calling radio.

4. The system of claim 1 further comprising:

means for notifying a user that a received page message corresponds to a received incoming call.

5. A method for providing caller identification in a radio communication system having at least one cell, wherein said radio communication system comprises radios that are capable of receiving and displaying page messages having a text or numeric format and wherein said radios are also capable of voice communication with a caller via said at least one cell, said method comprising the steps of:

creating a page message that identifies a source of a voice call being routed to a called radio;

sending said page message to said called radio;

initiating voice communications between said called radio and said caller immediately after sending said page message.

6. The method of claim 5 further comprising the steps of:

determining a current checked-in cell for said called radio; and sending said call request data from an originating cell to said current checked-in cell.

7. The method of claim 5 wherein said page message identifies said calling radio.

8. The method of claim 5 wherein said call request data corresponds to a group call to a particular group of radios; and wherein said page message comprises an identification of said group.

9. The method of claim 5 further comprising the step of:

receiving an incoming call signals from a public switched telephone network (PSTN) which is coupled to an originating cell, wherein said incoming call signals comprise automatic number identification (ANI) information; and wherein said page message comprises said ANI information.

10. The method of claim 5 further comprising the step of:

notifying a user that a page message, which corresponds to an incoming call, is available.

11. A base station for a radio communication system comprising:

a processor which receives call request signals, said processor capable of determining a source identification from said call request signals and generating a page message comprising said source identification;

a transmitter coupled to said processor, said transmitter transmitting said page message to a called radio immediately before transmitting call set up signals to said called radio.

12. The base station of claim 11 further comprising:

a memory comprising a list of current checked-in radios and a table of current cells for radios assigned to said base station; and wherein said processor forwards said call request signals to a current cell of said called radio.

13. The base station of claim 11 further comprising:

a communication link coupled between said base station and one or more other base stations.

14. The base station of claim 13 wherein said communication link is capable of carrying both voice and data signals.

15. The base station of claim 14 wherein said processor is capable of exchanging call request signals with said other base stations via said communication link.

16. A method of providing caller identification information in a radio communication system having a plurality of interlinked base stations, each of said base stations representing a separate cell, said method comprising the steps of:

receiving an initial voice call message for a called radio at an originating base station;

determining whether said called radio is checked-in to said originating base station;

if said called radio is checked-in with said originating base station, then sending a voice call set up message to said called radio;

if said called radio is not checked-in with said originating base station, then identifying a current base station for said called radio, and sending said initial voice call message to said current base station; and sending said voice call set up message to said called radio;

determining a source identifier for said voice initial call message;

creating a page message comprising information derived from said source identifier;

sending said page message to said called radio;

sending voice communication signal to said called radio immediately after sending said page message; and notifying a user that said page message is available on said called radio.

17. The method of claim 16 wherein said current base station configures said page message.

18. The method of claim 16 wherein a calling radio initiates a group call to a particular group; and wherein said called radio is a member of said particular group.

19. The method of claim 16 wherein said initial voice call message corresponds to a call originating from a publicly switched telephone network (PSTN) coupled to said originating base station; and wherein said page message comprises automatic number identification information received from the PSTN.

\* \* \* \* \*